April 16, 1968   W. A. RAMSEY ET AL   3,377,897
AUTOMATIC CUTTING APPARATUS AND METHOD OF CUTTING
Filed April 11, 1966   3 Sheets-Sheet 1
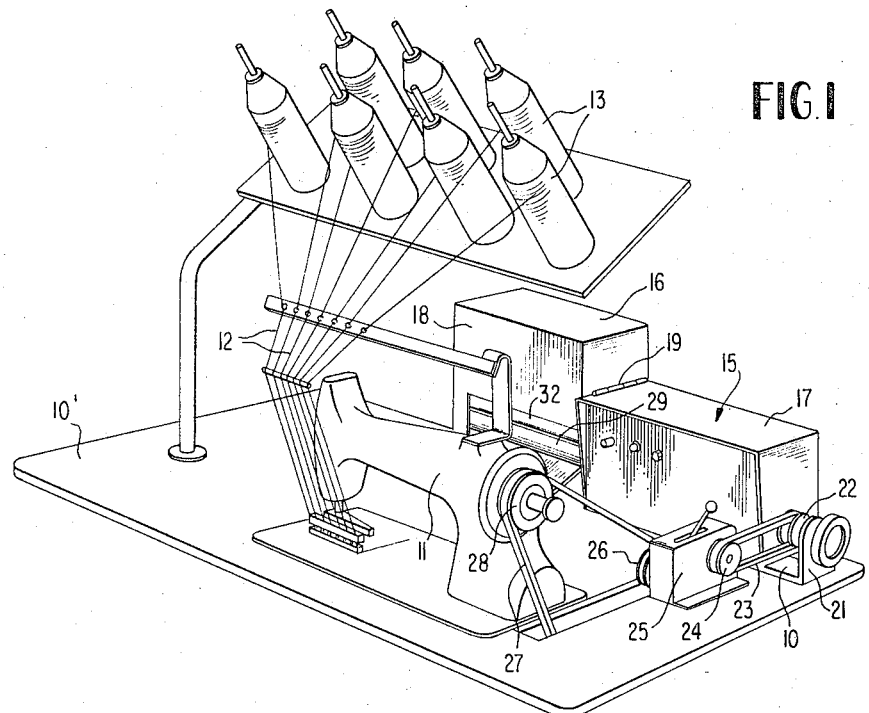
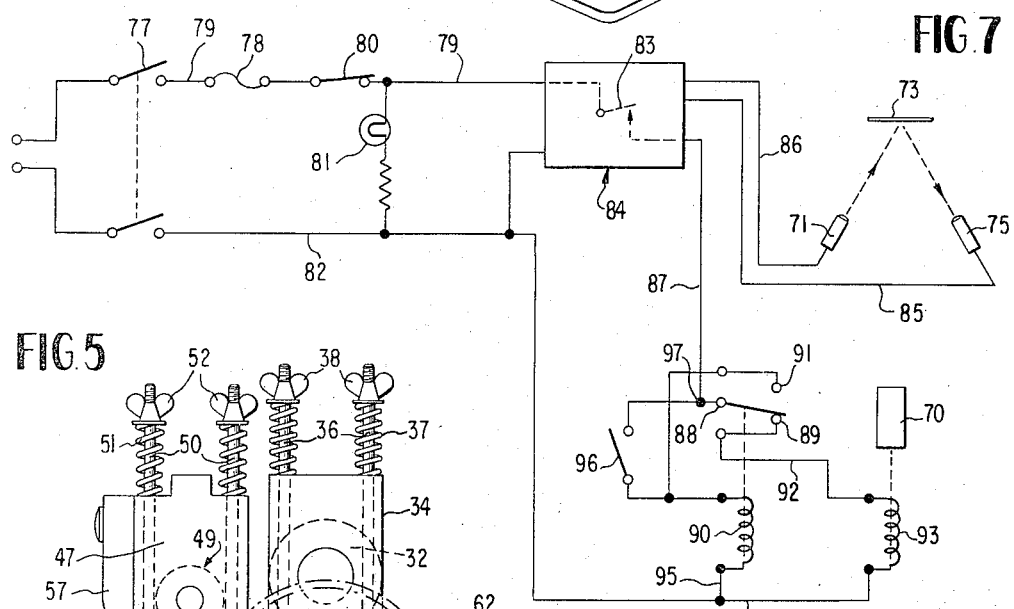
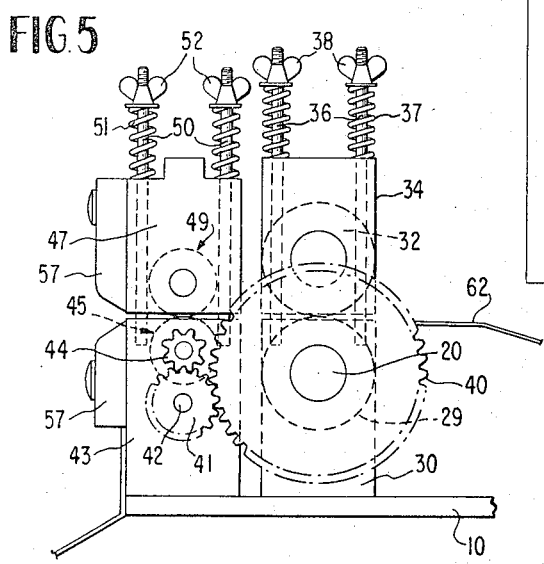
INVENTORS
WILLARD A. RAMSEY
ARON G. COLN
BY
ATTORNEY

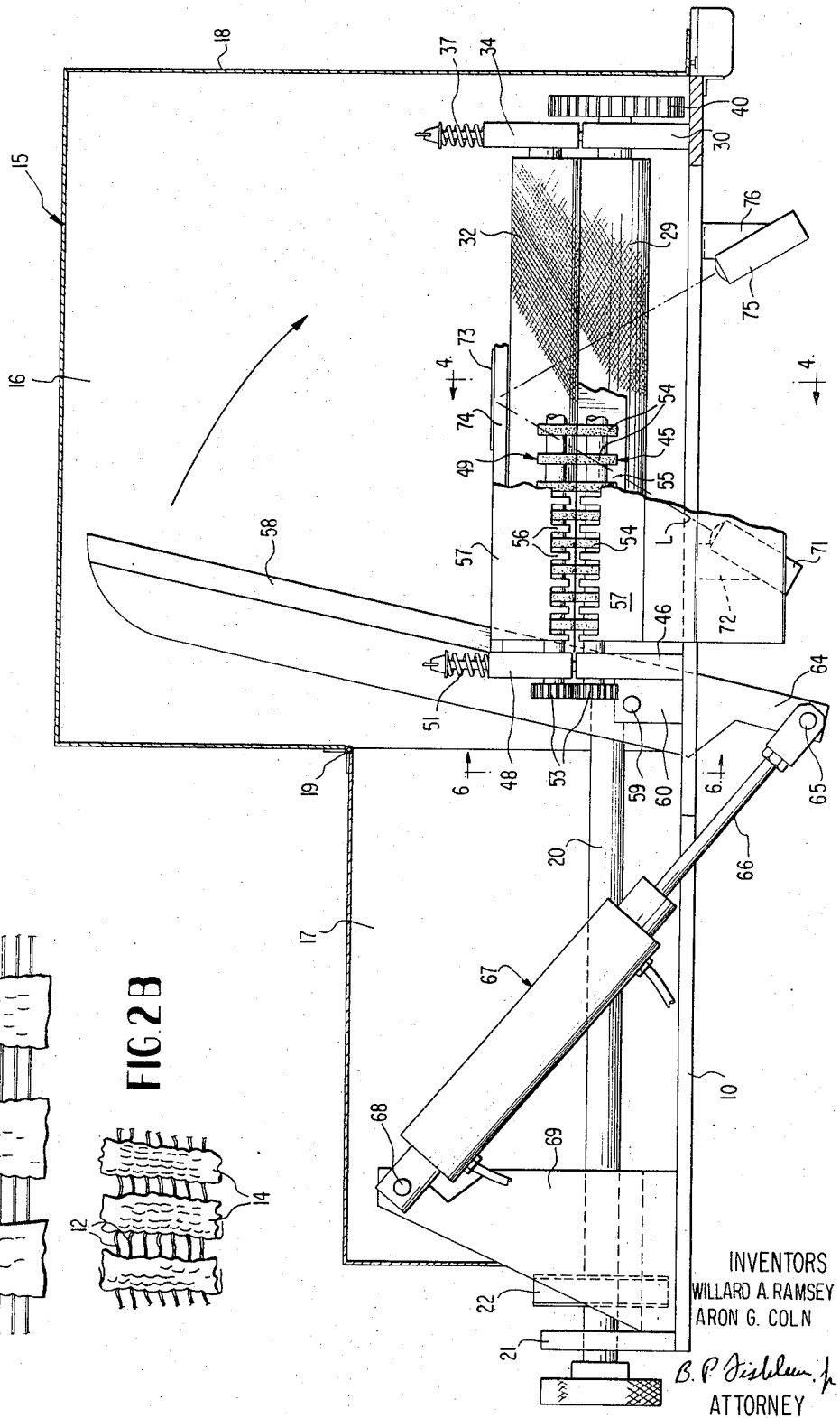
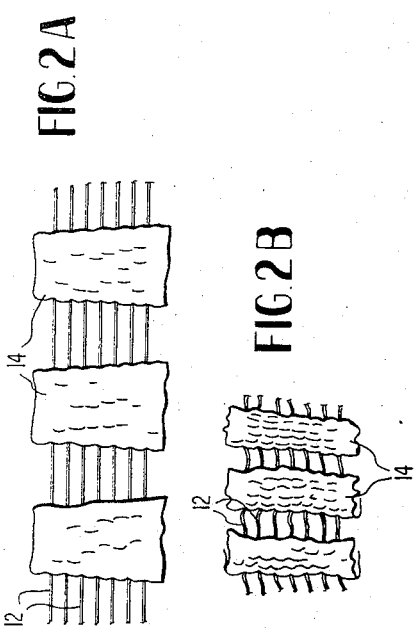

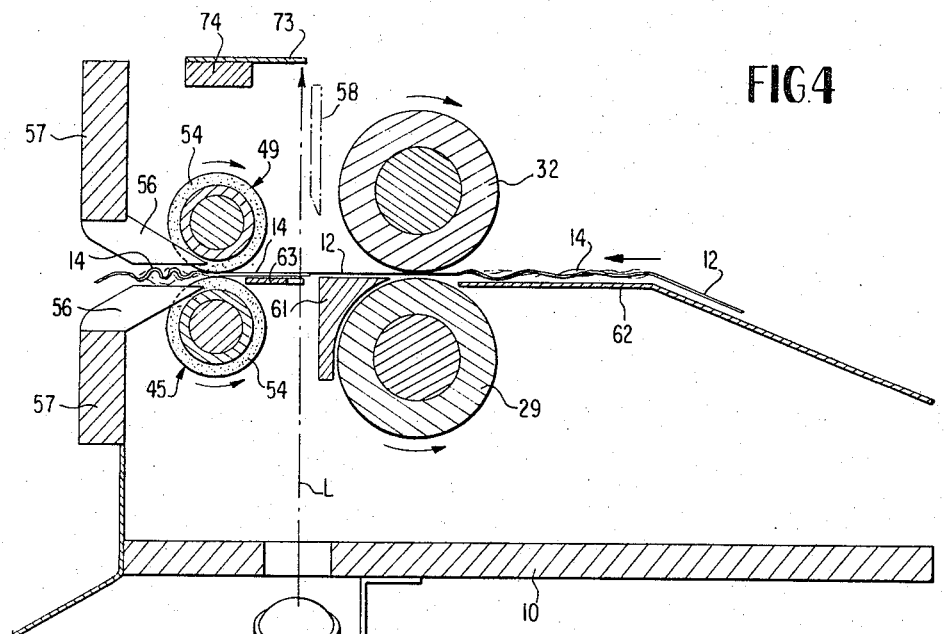
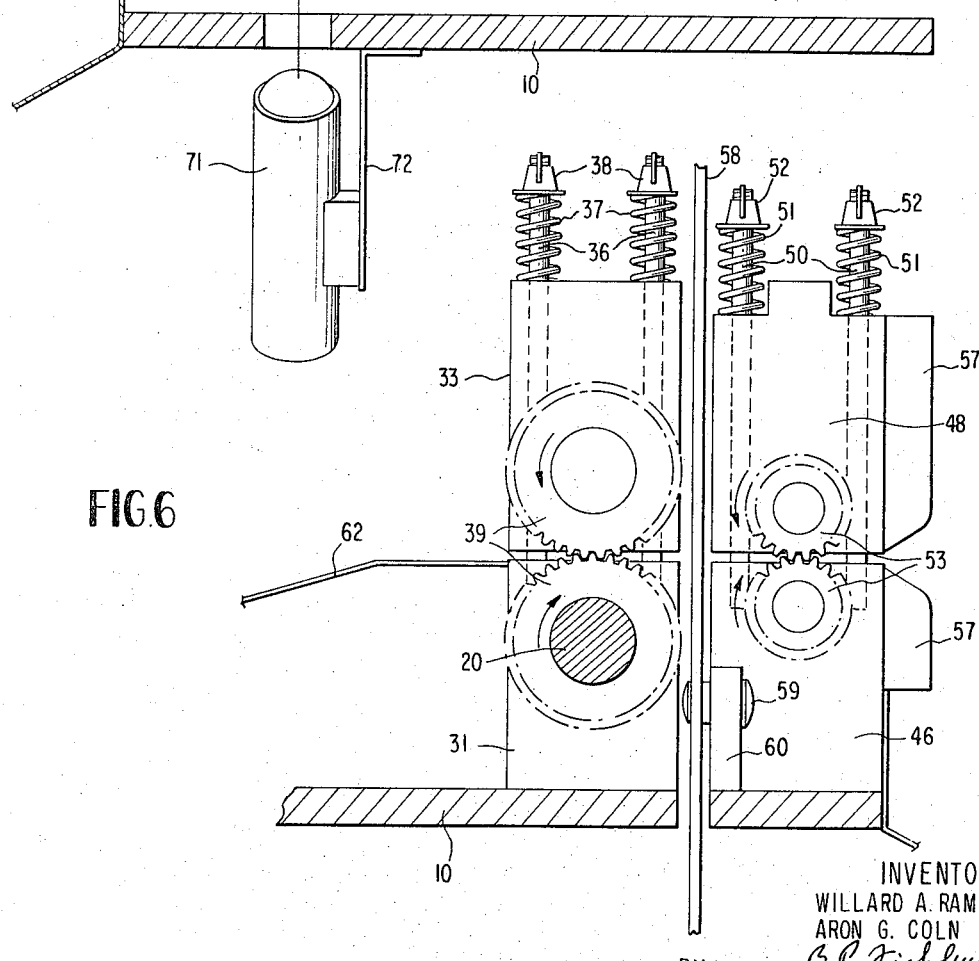

United States Patent Office 3,377,897
Patented Apr. 16, 1968

3,377,897
AUTOMATIC CUTTING APPARATUS AND METHOD OF CUTTING
Willard A. Ramsey and Aaron G. Coln, Greenville, S.C., assignors to Her Majesty Underwear Company, Mauldin, S.C., a corporation of South Carolina
Filed Apr. 11, 1966, Ser. No. 541,670
12 Claims. (Cl. 83—18)

ABSTRACT OF THE DISCLOSURE

Material to be cut consists of spaced fabric patches connected by elastic strands. The composite material is gripped and fed at spaced points with the feeding rate at one point greater than at the other point to thereby stretch the material during feeding. The passage of patches in the region between the two feeding points is sensed and in response to the sensing, the stretched elastic strands are automatically severed between patches.

---

This invention relates to automatic cutting apparatus, and more particularly to an apparatus for cutting elastic strands between patches of cloth in an accurate and uniform manner, and also to a method of cutting.

In the manufacturing of certain garments, such as slips, elastic expansion side panels are placed in the slips during manufacturing. These side panels constitute patches of cloth which are connected to plural parallel strands of elastic. The size of the patches may vary somewhat and the number of strands may vary. It is customary to produce a continuous chain of connected cloth patches and elastic strands continuously and rapidly on a multiple needle sewing machine.

It has also been customary in the art to separate the connected patches manually by cutting the elastic strands by hand between the patches and no satisfactory machinery has been found for this purpose. The problem is rendered difficult due to the fact that side panels of different sizes must be fabricated and further because the connecting elastic strands recoil immediately on being cut and the patches secured to the strands tend to shrivel. The composite material is very unwieldly and heretofore no known apparatus has been devised to deal with this problem.

Accordingly, it is the object of the invention to provide a cutting apparatus for use in conjunction with a multiple needle sewing machine for cleanly severing connecting elastic strands between cloth patches or panels to which the strands have been attached by a sewing operation. The apparatus is capable of feeding a continuous assembly or chain of patches and strands as they emerge from the sewing machine, stretching the elastic strands in a uniform manner between adjacent pairs of patches, severing the strands cleanly at the desired points between the patches, retrieving the recoiled strands after severing, continuing to feed the chain of work and re-stretching the strands prior to performing the next cutting or severing cycle.

A further object of the invention is to provide a novel apparatus and method of the above-mentioned character which is characterized by simplicity and speed of operation, ease of maintenance, reliability and efficiency in operation and economy and durability of construction.

Other objects and advantages of the invention will become apparent during the course of the following detailed description.

In the accompanying drawings, forming a part of this application and in which like numerals are employed to designate like parts throughout the same, FIGURE 1 is a general perspective view of the cutting apparatus shown in conjunction with a multiple needle sewing machine;

FIGURE 2A is a fragmentary plan view of the assembled work produced by the sewing machine in a stretched condition preparatory to cutting between patches;

FIGURE 2B is a similar view of the work in a relaxed condition;

FIGURE 3 is an enlarged rear side elevational view, partly in section, of the cutting apparatus;

FIGURE 4 is an enlarged transverse vertical section taken on line 4—4 of FIGURE 3;

FIGURE 5 is an end elevational view of the apparatus in FIGURE 3, with parts omitted and looking from the right-hand end of FIGURE 3;

FIGURE 6 is an enlarged fragmentary transverse vertical section taken on line 6—6 of FIGURE 3; and FIGURE 7 is an electrical schematic of the circuit employed with the apparatus and constituting a part thereof.

In the drawings, wherein for the purpose of illustration is shown a preferred embodiment of the invention, attention is directed first to FIGURE 1 showing a suitable work table 10' or support upon which is mounted a conventional multiple needle sewing machine 11 whose needles take multiple elastic strands 12 from supply packages 13 above the machine and stitch these strands to generally rectangular cloth patches 14 which, after separation, become the expansion side panels in the bodice portion of slips.

The automatic elastic strand cutting apparatus proper used in conjunction with the sewing machine and forming the direct subject matter of this invention is shown in its entirety by the numeral 15 in FIGURE 1 and is also mounted upon the table 10' opposite the rear side of the sewing machine from which the work shown in FIGURES 2A and 2B is continually discharged. The invention apparatus has its own base plate or table 10, FIGURES 3, 4 and 6, which may be bolted directly to the sewing machine table 10' near the rear side thereof. In this connection, the invention is adaptable to a variety of sewing machine types. As shown in FIGURE 1, the longitudinal axis of the cutting apparatus 15 is parallel to the arm of the sewing machine. The apparatus 15 in general includes a work feeding and cutting section 16 immediately behind the sewing machine needles and a control section 17 spaced laterally from the needles and the section 16. As shown, the cutting apparatus is housed for reasons of safety and appearance and the housing 18 for the cutting section of the apparatus is hinged at 19 so that it can be raised to allow easy access to the apparatus.

The details of the apparatus 15 are depicted primarily in FIGURES 3 to 6 inclusive, and in these figures, the numeral 20 designates a main drive shaft having one end portion journaled for rotation in a bearing support 21 near one edge of the base plate 10. Inwardly of this bearing support, the main drive shaft carries a drive pulley 22 which receives power from a belt 23, FIGURE 1, connected with an output pulley 24 of sewing machine speed control box 25. An input pulley 26 on the control box 25 in turn is powered by a belt 27 which engages the main pulley 28 on the sewing machine 11.

The shaft 20 near its end remote from the bearing support 21 carries a bottom feed roll 29, which is one of a pair of equal diameter cylindrical knurled aluminum rolls. The lower feed roll 29 is suitably rigidly secured to the shaft 20 to turn therewith. The shaft 20 is further journaled upon an end bearing block 30, FIGURE 5, and an intermediate bearing block 31, FIGURE 6. Immediately above the lower feed roll 29, an identical feed roll 32 is carried by another rotary shaft whose ends are journaled in upper bearing blocks 33 and 34. These upper blocks 33 and 34 are vertically movable on screw-threaded guide rods 36 whose lower ends have screw-threaded engagement with the lower blocks 31 and 30. Compression springs 37 surrounding the rods 36 urge the upper blocks 33 and 34 with the upper feed roll 32 downwardly and the tension of the springs 37 may be adjusted by means of winged nuts 38 on the tops of the rods 36. In this manner, the pressure between the two knurled feed rolls 29 and 32 may be varied.

As shown in FIGURE 6, the rolls 29 and 32 may be geared together at their inner ends by a pair of equally sized gears 39, the lower one of which is secured to the main drive shaft 20. The gears 39 are optional and in most instances may be omitted. When omitted, the upper roll 32 is simply permitted to float freely and is driven frictionally by the lower positively driven roll 29. The remote end of shaft 20, FIGURE 5, carries a larger gear 40 which meshes with a relatively small lower gear 41 on a stub shaft 42 mounted upon an adjacent lower bearing block 43 secured to table 10. The lower gear 41 meshes with and drives a still smaller gear 44 on the shaft of a lower take-up roll 45. The remote end of take-up roll 45 is supported through its shaft on a bearing block 46 arranged laterally adjacent to the block 31, FIGURE 6. Immediately above the bearing blocks 43 and 46 are additional blocks 47 and 48 for the support of an upper take-up roll 49 which has rolling contact with the underlying roll 45. The upper blocks 47 and 48 are vertically adjustable on guide rods 50 in the same manner described for the blocks 34 and 33. Springs 51 surround the rods 50 and bear downwardly on the blocks 47 and 48 and have their tensions adjusted by winged nuts 52, as shown in the drawings. The ends of the take-up rolls 45 and 49 remote from gears 41 and 44 and adjacent to gears 39 are interconnected by a pair of equally sized gears 53 which are considerably smaller than the gears 39, as best shown in FIGURE 6. As shown in FIGURE 5, the nips of the feed rolls 29 and 32 and the take-up rolls 45 and 49 lie in a common horizontal plane so that the work may pass first between the feed rolls and secondly to and between the take-up rolls, as will be further described.

Each of the take-up rolls 45 and 49 consists of a multiplicity of axially spaced preferably cork sections or discs 54, between which are spaces 55 for the teeth 56 of fixed combs 57, the latter being suitably secured to the upper and lower pairs of bearing blocks. As best shown in FIGURE 4, the pointed comb teeth project into the annular spaces of the take-up rolls between the cork discs 54 to assure stripping of the cloth patches 14 cleanly from the take-up rolls during operation of the apparatus.

The already-described gearing for the feed rolls 29 and 32 and the take-up rolls 45 and 49 causes the latter rolls to rotate approximately four times as fast as the front feed roll, whereby the elastic strands 12 are stretched and held taut between the two sets of rolls, as clearly shown in FIGURE 4.

In order to sever the elastic strands 12 cleanly between adjacent patches 14, a vertically swingable shearing knife 58 is provided on the apparatus between the material feed and take-up rolls, and this knife is pivoted near its lower end at 59 to a block 60 secured fixedly to table 10. The knife 59 is therefore mounted near the inward ends of the feed and take-up rolls and is clear of the space between the two sets of rolls while in the elevated generally vertical position shown in FIGURE 3. When the knife swings downwardly in the direction of the arrow under the influence of automatic power means to be described, its shearing edge will coact with the shearing edge of a stationary cutter element 61 mounted immediately inwardly of the feed roll 29 and just below the feed roll 32, FIGURE 4. This coaction will cleanly sever the elastic strands 12 between the two sets of rolls of the apparatus. A stationary approach ramp or plate 62 is preferably provided on the apparatus for ease of feeding the continuous material from the sewing machine to the feed rolls 29 and 32. If desired, a short stationary platform plate 63 may be positioned between the stationary cutter element 61 and the take-up rolls to assure adequate support of the flexible material being processed by the apparatus.

The knife 58 has a depending extension 64 below the table 10, pivoted at 65 to the piston rod 66 of cylinder-piston unit 67. The rear end of unit 67 is in turn pivotally connected at 68 to a fixed upstanding bracket 69 on the table 10. The cylinder-piston unit 67 may be of a conventional fluid-pressure operation type whose piston rod 66 may be retracted or extended to cause lowering or raising of the knife 58, according to a desired cycle of operation. The operation of the unit 67 is under control of a solenoid-operated valve 70 shown diagrammatically in FIGURE 7 of the drawings. The valve has been omitted from the other views for simplicity of illustration and because the valve and the cylinder-piston unit and their connections may be conventional.

Sensing of the presence of the patches 14 passing between the feed and take-up rolls and the initiation of the cutting cycle is accomplished by means of an inclined light source 71 mounted on a bracket 72 beneath the table 10, and directing a beam of light onto an overhead horizontal reflector 73, mounted on a stationary plate 74 above the take-up rolls 45 and 49, FIGURES 3 and 4. The reflector 73 reflects the light beam downwardly onto an inclined photoelectric cell 75 carried by a fixed bracket 76 on the table 10. As best shown in FIGURE 4, the light beam indicated at L passes through the relatively narrow space between the stationary cutter 61 and the take-up rolls of the apparatus. The plate 63, if employed, is notched to allow unobstructed passage of the light beam for sensing the presence or absence of one of the patches 14 in the cutting zone.

Referring to FIGURE 7 of the drawings, an off-on power switch 77 is connected across the source of power which may be a conventional 115 volt AC sixty cycle source. A fuse 78 is connected in a wire 79 leading from one terminal of the switch 77, and a safety interlock 80 in the same wire 79 interrupts power whenever the hinged housing section 16 is swung upwardly on its hinge 19 to expose the feeding and cutting mechanism. This is a safety feature of the apparatus. A pilot lamp 81 is connected across the wire 79 and another wire 82 which leads to the other terminal of power switch 77. The power switch, fuse and pilot light are preferably located upon the front panel of housing section 17 in easy view of the operator.

The wire 79 leads to a contact 83 of a photoelectric cell amplifier 84, connected therewith through a wire 85 and connected with the light source 71 through a wire 86. From contact 83, a wire 87 leads to normally closed contacts 88–89 of relay 90 which also has normally open contacts 88–91, as shown. Another wire 92 leads from the normally closed relay contacts to a solenoid coil 93 of air valve 70 which controls the operation of cylinder-piston unit 67. From the solenoid coil 93, a wire 94 is connected at 95 with the relay 90 and leads back to the wire 82 and power switch 77. A knife cycle switch 96 is connected between the relay coil 90 and the wire 87, where the latter connects at 97 with the center relay contact 88.

The mode of operation of the apparatus is as follows:

A chain of the patches 14 connected by the elastic strands 12 enters the cutting apparatus from the sewing machine in the direction of the arrow shown in FIGURE 4. The material passes between feed rolls 29 and 32 and is gripped by the same. As the leading patch 14 moves through the feed rolls, its elastic strands relax and the patch tends to curl or shrivel as depicted in FIGURE 2B. As this leading patch moves over the stationary cutter element 61 and into the space immediately therebeyond, its leading edge interrupts the light beam L from source 71. This causes opening of contact 83 and immediately de-energizes relay 90. As the patch 14 continues to move across the space between the feed and take-up rolls, it is picked up by the latter rolls 45 and 49 which are being driven approximately four times as fast as the feed rolls 29 and 32 through the described gearing. Thus, the particular patch 14 will be stretched between the feed and take-up rolls, as shown clearly in FIGURE 4.

The patch 14 continues to pass through the take-up rolls 45 and 49 until its trailing edge clears the space through which the light beam L is passing, then allowing the light beam to pass again to the reflector and photoelectric cell 75. When this occurs, contact 83 is closed and from the amplifier 220-volt AC is applied through normally closed relay contacts 88–89 and wire 92 to air valve solenoid coil 93. This activates the control valve 70 causing the cylinder-piston unit 67 to retract piston rod 66 and immediately swing the knife 58 downwardly to sever the elastic strands 12, now stretched between the feed rolls 29 and 32 and the take-up rolls 54 and 49. The knife 58 coacts with the edge of the stationary cutter 61 to produce this severing of the elastic strands 12 at the proper point. The severed patch 14 now exists between the combs 57 which assure stripping of the separated patch from the take-up rolls, and this patch may now drop from the apparatus into any suitable collection means.

When the cutting knife 58 completes its downward stroke, its back edge engages and closes knife cycle switch 96, which switch is suitably supported in the path of movement of the knife. The closing of this switch applies power to relay 90 interrupting power to solenoid winding 93, permitting cylinder-piston unit 67 to return the cutting knife 58 to the elevated inactive position shown in FIGURE 3. Relay 90 holds in this condition through contact 83 and normally open contacts 88–91 until the light beam L is interrupted by the leading edge of the next approaching patch 14 initiating a new complete cycle of operation. It should be mentioned that if either the upward or downward leg of the light beam in FIGURE 3 is interrupted, the photocell 75 will be de-activated. This arrangement provides a wide area of light sensitivity along the lengths of the apparatus rolls, FIGURE 3, so that even small patches cannot pass through the apparatus without interrupting the light and effecting the proper cutting cycle.

It should now be apparent that the apparatus deals with the problem of severing the elastic strands between connected patches whose individual sizes may differ and which have a tendency to shrink or curl when relaxed. The apparatus feeds the material and then stetches it between two sets of rolls for severing, senses the proper position of the patches and strands for severing, automatically severs the strands between patches, retrieves the severed material which immediately recoils after severing, continues to feed the severed material and restretches it for the next cutting operation, all automatically. The advantages of the invention method and apparatus should be readily apparent to those skilled in the art.

It is to be understood that the form of the invention herewith shown and described is to be taken as a preferred example of the same, and that various changes in the shape, size and arrangement of parts may be resorted to, without departing from the spirit of the invention or scope of the subjoined claims.

What is claimed is:

1. A method of cutting prefabricated material to separate spaced-apart patches in said material connected by elastic strands comprising gripping said material at first and second spaced points and feeding the material in one direction at both points, the feeding of the material at the second point being significantly faster than the feeding at the first point to thereby stretch the material between said points during the continuous feeding thereof, sensing the passage of said patches in the region between said first and second points, and severing said strands in said region responsive to said sensing to cleanly separate adjacent patches.

2. The invention as defined in claim 1, and utilizing light-responsive electrical means for said sensing and cutting.

3. Apparatus for cutting comprising a pair of feed rolls, a pair of take-up rolls in advance of the feed rolls, gearing interconnecting the feed and take-up rolls to turn them in unison and in the same direction and with the take-up rolls turning at a substantially greater rate than the feed rolls, light-sensitive detecting means arranged between said feed and take-up rolls and operable to sense the presence or absence of opaque material between the feed and take-up rolls, and power-operated cutter means connected with and set into action by said detecting means and operable to cut material between said feed rolls and take-up rolls along a line substantially parallel to the axes of said rolls.

4. The invention as defined in claim 3, and wherein said cutter means includes a knife pivotally secured to said apparatus near corresponding ends of said feed and take-up rolls and swingable vertically to a cutting position between said rolls, and a coacting stationary cutting element between the feed and take-up rolls.

5. The invention as defined by claim 3, and wherein said detecting means comprises a source of light beneath and between said feed and take-up rolls, a photoelectric cell beneath and between said rolls and spaced from the source of light axially of said rolls, and a light reflector above and between said feed and take-up rolls.

6. The invention as defined by claim 3, and wherein said power-operated cutter means comprises a movable cutter knife, a fluid-pressure operated device for shifting said knife toward and away from a cutting position between said feed and take-up rolls, a solenoid-operated control valve for said device, and a relay electrically connected with the solenoid of said valve and also electrically connected with said detecting means.

7. A cutting apparatus comprising an input rotary drive shaft, a lower feed roll mounted upon and driven by said drive shaft, an upper feed roll to turn with the lower feed roll for feeding sheet-like material, a pair of take-up rolls spaced laterally of the feed rolls and parallel thereto, the take-up and feed rolls having nips lying in a common plane so that said material can pass readily from the feed rolls to the take-up rolls, gearing drivingly connecting one feed roll and one take-up roll so that the take-up rolls turn in unison with the feed rolls and in the same direction but at a significantly greater rate, a stationary and a movable cutter element between said feed and take-up rolls to sever material passing through said rolls, light-sensitive detector means positioned to detect the passage of opaque portions of said material between the feed and take-up rolls, and electrically-operated power means connected with said detector means and set into operation by the latter to shift the movable cutter element to a cutting position relative to the stationary cutter element.

8. The invention as defined by claim 7, and fixed bearing parts supporting the lower feed and take-up rolls, movable bearing parts supporting said upper feed and take-up rolls, guide means for the movable bearing parts, and adjustable tension resilient means engaging the movable bearing parts and urging them with the upper feed and take-up rolls toward the lower feed and take-up rolls.

9. The invention as defined by claim 7, and wherein said feed rolls comprise knurled metallic rolls and said take-up rolls comprise axially spaced segments of resilient material, and stripping comb teeth projecting into the spaces of the take-up rolls between said segments.

10. The invention as defined by claim 9, and wherein said segments are cylindrical discs of cork.

11. The invention as defined by claim 9, and wherein said comb teeth are arranged in opposed pairs above and below the nips of the take-up rolls so that material passing between the take-up rolls can also pass between said opposed teeth, said teeth preventing the material from adhering to the take-up rolls.

12. A method of cleanly separating variously sized clot patches which are stitched to a plurality of elastic strands so as to form a chain of material longitudinally of the strands with the patches spaced along the strands, said method comprising grippingly engaging said material at a first point along the material and positively feeding the material in one direction at a fixed rate, grippingly engaging the material at a second point therealong in advance of the first point and feeding the material in the same direction at the second point but at a significantly increased rate in comparison to the feeding at the first point to thereby stretch the material during feeding between the first and second points, detecting the presence and absence of said patches during their passage between the first and second points of feeding, severing the material in the stretched region thereof between the first and second points in response to said detection to separate said patches, and repeating the method steps to stretch the material in additional regions between the first and second points of feeding and to sever the material in such additional regions.

References Cited
UNITED STATES PATENTS

| | | | |
|---|---|---|---|
| 1,140,392 | 5/1915 | Novick | 83—110 |
| 1,487,663 | 3/1924 | Langston | 83—175 X |
| 2,939,354 | 6/1960 | King | 83—371 X |
| 3,182,536 | 5/1965 | Sumpter et al. | 83—175 X |
| 3,334,532 | 8/1967 | Mylo | 83—175 |

JAMES M. MEISTER, *Primary Examiner.*